US012005715B2

(12) United States Patent
Hane et al.

(10) Patent No.: US 12,005,715 B2
(45) Date of Patent: Jun. 11, 2024

(54) PRINTING APPARATUS

(71) Applicant: CANON KABUSHIKI KAISHA, Tokyo (JP)

(72) Inventors: Takuya Hane, Kanagawa (JP); Takaya Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/401,162

(22) Filed: Aug. 12, 2021

(65) Prior Publication Data

US 2022/0063285 A1 Mar. 3, 2022

(30) Foreign Application Priority Data

Aug. 25, 2020 (JP) ................................ 2020-142110

(51) Int. Cl.
*B41J 2/175* (2006.01)
*B41J 2/185* (2006.01)
*B41J 2/195* (2006.01)

(52) U.S. Cl.
CPC .......... *B41J 2/17503* (2013.01); *B41J 2/185* (2013.01); *B41J 2/195* (2013.01)

(58) Field of Classification Search
CPC . B41J 2/175; B41J 2/17509; B41J 2/18; B41J 2/185; B41J 2/195; B41J 2/17506; B41J 2/1707; B41J 2/04571; B41J 2/211; B41J 2202/12; B41J 2/17566
See application file for complete search history.

(56) References Cited

U.S. PATENT DOCUMENTS

2019/0224984 A1* 7/2019 Kodera .................. B41J 2/1707
2019/0263135 A1* 8/2019 Abe ........................... B41J 2/19
2019/0299636 A1* 10/2019 Tanabe ................... B41J 2/1752
2020/0307238 A1* 10/2020 Kuno ......................... B41J 2/18

FOREIGN PATENT DOCUMENTS

JP 2005199579 A 7/2005

* cited by examiner

*Primary Examiner* — Jannelle M Lebron
(74) *Attorney, Agent, or Firm* — CANON U.S.A., INC. IP Division

(57) ABSTRACT

A printing apparatus includes a tank configured to store a liquid to be supplied to a print head, a supply channel configured to supply the liquid from the tank to the print head, a replenishment channel configured to replenish the tank with the liquid, and a stirring unit in the tank, the stirring unit being configured to stir the liquid in the tank by rotating in a first rotation direction. A first distance from a supply port at which the supply channel opens in the tank to a replenishment port at which the replenishment channel opens in the tank in the first rotation direction is less than a second distance from the replenishment port to the supply port in the first rotation direction.

14 Claims, 10 Drawing Sheets

PRINTING APPARATUS

BACKGROUND

Field of the Disclosure

The present disclosure relates to printing apparatuses that print images.

Description of the Related Art

There is an inkjet printing apparatus that includes a circulation mechanism for supplying ink stored in a tank to a print head and collecting ink not discharged from the print head into the tank.

Japanese Patent Application Laid-Open No. 2005-199579 discusses a configuration of supplying ink from a main tank to a print head and collecting the ink into the main tank via a return line. Further, a replenishment unit for replenishing the main tank with ink is connected to the main tank. The set maximum distance L1 reduces direct supply of the replenishment ink to the print head, where $L_1$ is between the position where the replenishment unit replenishes the main tank with ink and the position of an inlet for supplying ink to a print head.

The configuration of Japanese Patent Application Laid-Open No. 2005-199579 however can have a higher concentration of the ink collected from the print head, enough to be re-supplied to the print head again, presenting inconsistencies in ink density that can lead to unevenness of color on an image printed by the print head.

SUMMARY

In view of the above-described issue, the present disclosure is directed to reducing concentration unevenness of a liquid.

According to an aspect of the present disclosure, a printing apparatus includes a tank configured to store a liquid to be supplied to a print head, a supply channel, which opens in the tank through a supply port, configured to supply the liquid from the tank to the print head, a replenishment channel, which opens in the tank though a replenishment port, configured to replenish the tank with the liquid, and a stirring unit in the tank, the stirring unit being configured to stir the liquid in the tank by rotating in a first rotation direction. A first distance from the supply port to the replenishment port in the first rotation direction is less than a second distance from the replenishment port to the supply port in the first rotation direction.

Further features of the present disclosure will become apparent from the following description of exemplary embodiments with reference to the attached drawings.

DESCRIPTION OF THE EMBODIMENTS

Figure 1:
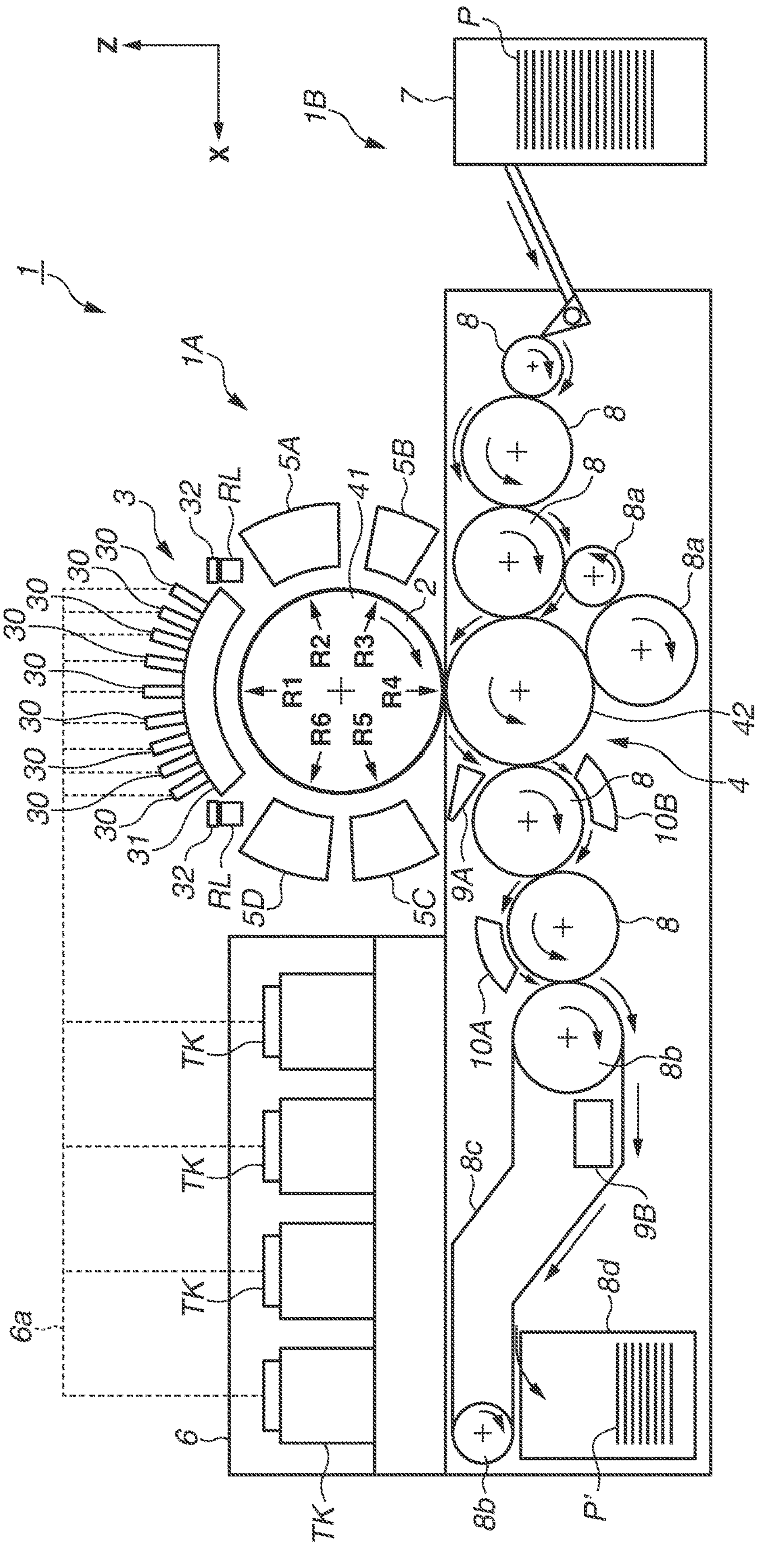
FIG. 1 is a schematic diagram of a printing system according to a first exemplary embodiment.

Some exemplary embodiments of the present disclosure will be described below with reference to the drawings. The following exemplary embodiments do not limit the present disclosure, and not all the combinations of features described in the present exemplary embodiments are used in the solution of the present disclosure. Further, the relative positions, shapes, and the like of the constituent elements described in the exemplary embodiments are mere examples and are not intended to limit the scope of the present disclosure thereto. In the drawings, arrows X and Y indicate horizontal directions orthogonal to each other, and an arrow Z indicates a vertical direction.

<Printing System>

FIG. 1 is a schematic front view of a printing system 1 according to a first exemplary embodiment of the present disclosure. The printing system 1 is a sheet-fed inkjet printer (an inkjet printing apparatus) to produce printed products P' by transferring ink images to print media P via a transfer body 2. The printing system 1 includes a printing apparatus 1A and a conveyance apparatus 1B. In the present exemplary embodiment, an X direction, a Y direction, and a Z direction indicate a width direction (a full-length direction), a depth direction, and a height direction, respectively, of the printing system 1. The print media P are conveyed in the X direction.

The term "printing" includes forming information such as characters or diagrams, and widely includes forming images, designs, patterns, or the like on print media, and processing media. Further, in the present exemplary embodiment, "print media" is assumed to be paper sheets, but may be textiles or plastic films.

The components of the ink are not particularly limited, and in the present exemplary embodiment, aqueous pigment ink containing a color material, water, and resin are used.

<Printing Apparatus>

The printing apparatus 1A includes a printing unit 3, a transfer unit 4, peripheral units 5A to 5D, and a supply unit 6.

<Printing Unit>

Figure 2:
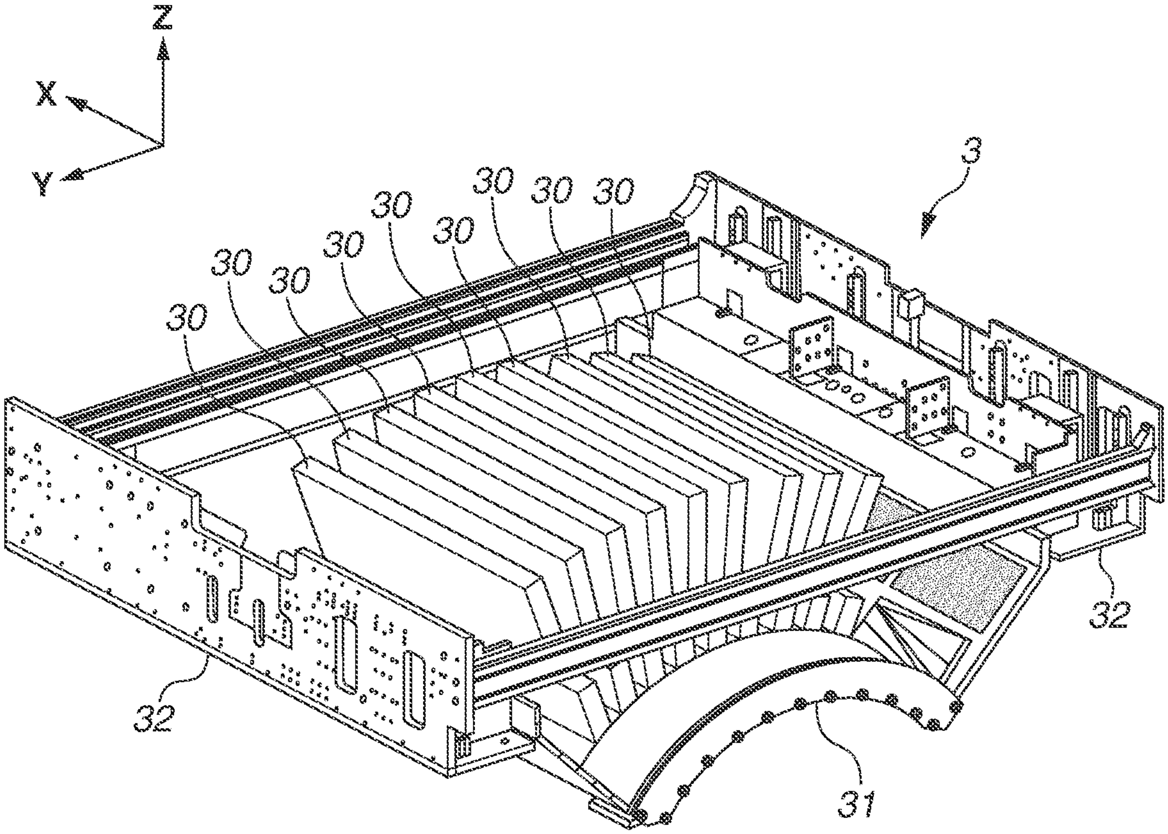
FIG. 2 is a perspective view of a printing unit according to the first exemplary embodiment.

The printing unit 3 includes a plurality of print heads 30 and a carriage 31. The following is a description with reference to FIG. 1 and FIG. 2. FIG. 2 is a perspective view of the printing unit 3. The print head 30 discharges liquid ink to the transfer body 2, forming an ink image for forming a printed image on the transfer body 2.

In the present exemplary embodiment, each of the print heads 30 is a full-line print head extending in the Y direction, and its nozzles are arrayed in a range covering the width of an image print region of print media of the available maximum size. The print heads 30 have open orifices of nozzles in ink discharge surfaces at the end portions thereof, and each ink discharge surface faces the surface of the transfer body 2 with a minute clearance (e.g., a few millimeters) therebetween. In the present exemplary embodiment, the transfer body 2 is configured to circulate on a circular orbit, and thus the print heads 30 are radially positioned.

Each nozzle is provided with a discharge element. The discharge element is, for example, an element that discharges ink in the nozzle by pressure generated in the nozzle, and known techniques for inkjet print heads of inkjet printers are applicable. Examples of the discharge element include an element that discharges ink by a bubble formed by film boiling in ink caused by an electrothermal transducer, and an element that discharges ink using an electromechanical transducer, and an element that discharges ink using static electricity. The discharge element utilizing an electrothermal transducer is usable in terms of high-density printing at high speed.

In the present exemplary embodiment, nine print heads 30 are disposed. The print heads 30 discharge different types of ink from one another. The different types of ink are, for example, inks with different color materials, e.g., inks such as yellow ink, magenta ink, cyan ink, and black ink. Each of the print heads 30 discharges one type of ink, but may be configured to discharge two or more types of ink. In one or more embodiments, some of the print heads 30 discharge ink of a non-color material (for example, clear ink).

The carriage 31 supports the print heads 30. Each print head 30 has an end portion on the ink discharge surface fixed to the carriage 31, retaining the clearance between the ink discharge surface and the surface of the transfer body 2 with more accuracy. The carriage 31 is movable with the print heads 30 staying thereon along the guides of a pair of guiding members RL. In the present exemplary embodiment, the guiding members RL are rail members extending in the Y direction spaced apart from each other in the X direction. A pair of slide portions 32 are disposed near the carriage 31 in the X direction. The slide portions 32 in engagement with the guiding members RL slide along the guiding members RL in the Y direction.

Figure 3:
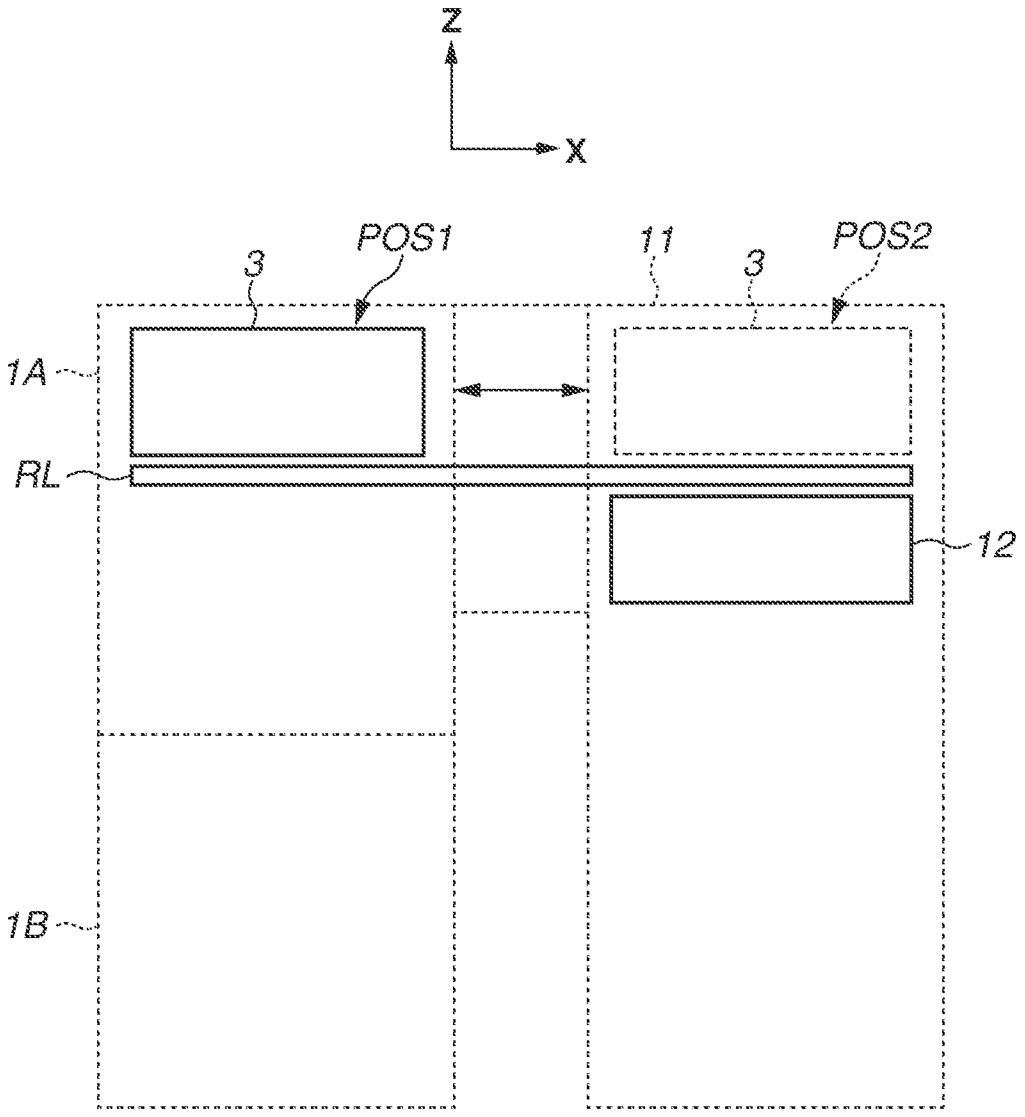
FIG. 3 is a diagram illustrating movement of the printing unit according to the first exemplary embodiment.

FIG. 3 illustrates movement of the printing unit 3, and schematically a right side view of the printing system 1. The printing system 1 has a rear unit 11 disposed in the rear of it, and the rear unit 11 includes a recovery unit 12. The recovery unit 12 includes a mechanism that recovers the discharge of the print head 30. Examples of such a mechanism include a cap mechanism that caps the ink discharge surface of each print head 30, a wiper mechanism that wipes the ink discharge surface, and a suction mechanism that sucks ink remaining in the print head 30 by negative pressure.

The guiding members RL extend from beside the transfer body 2 over the recovery unit 12. The printing unit 3 is movable between a discharge position POS1 of the printing unit 3 indicated by a solid line and a recovery position POS2 of the printing unit 3 indicated by a broken line along the guides of the guiding members RL by a drive mechanism (not illustrated). The discharge position POS1 is a position at which the printing unit 3 discharges ink to the transfer body 2 with the ink discharge surfaces of the print heads 30 facing the surface of the transfer body 2. The recovery position POS2 is a position to which the print head 30 is retracted from the discharge position POS1 with the print heads 30 positioned over the recovery unit 12. The recovery unit 12 can carry out a recovery process on the print heads 30 in the printing unit 3 at the recovery position POS2.

<Transfer Unit>

The transfer unit 4 will be described with reference to FIG. 1. The transfer unit 4 includes a transfer drum 41 and a pressurizing drum 42. These drums are rotational bodies each rotating about the rotation axis extending in the Y direction, and each have a cylindrically circumferential surface. In FIG. 1, curved arrows illustrated in the transfer drum 41 and the pressurizing drum 42 indicate their rotation directions, and the transfer drum 41 rotates clockwise while the pressurizing drum 42 rotates counterclockwise.

The transfer drum 41 is a support that supports the transfer body 2 on the circumferential surface thereof. The transfer body 2 is disposed on the circumferential surface of the transfer drum 41 continuously or intermittently in the circumferential direction. A continuous array of the transfer body 2 forms in an endless belt shape. In an intermittent array of the transfer body 2, the transfer body 2 is divided in a plurality of segments on a belt with ends, the segments of which are arrangeable in equal intervals in an arc on the circumferential surface of the transfer body 41.

The transfer body 2 is moved circularly on a circular orbit by the rotation of the transfer drum 41. The positions of the transfer body 2 can be distinguished each as a formation region R1, pre-transfer process regions R2 and R3, a transfer region R4, a post-transfer process region R5, and a pre-discharge process region R6, in rotational phases of the transfer drum 41. The transfer body 2 passes in front of these regions circularly.

The formation region R1 is a region where the printing unit 3 discharges ink to the transfer body 2 to form an ink image. The pre-transfer process regions R2 and R3 are regions where the ink image is processed before the transfer. Specifically, the pre-transfer process region R2 is a region where the ink image undergoes a process carried out by the peripheral unit 5A, and the pre-transfer process region R3 is a region where the ink image undergoes a process carried out by the peripheral unit 5B. The transfer region R4 is a region where the ink image on the transfer body 2 is transferred to a print medium P by the transfer unit 4. The post-transfer process region R5 is a region where the peripheral unit 5C carries out a post-process on the transfer body 2 after the transfer is performed. The pre-discharge process region R6 is a region where the peripheral unit 5D carries out a pre-process (in the present exemplary embodiment, application of a reaction liquid) on the transfer body 2 before the discharge of the ink is performed.

In the present exemplary embodiment, the formation region R1 extends in a certain section, and the regions R2 to R4 are substantially point (i.e., in lines) regions. Comparing the positions to the dial face of a clock, in the present exemplary embodiment, the formation region R1 is substantially in a range between 11 o'clock and 1 o'clock, the pre-transfer process region R2 is substantially located at 2 o'clock, and the pre-transfer process region R3 is substantially located at 4 o'clock. The transfer region R4 is substantially located at 6 o'clock, the post-transfer process region R5 is substantially located at 8 o'clock, and the pre-discharge process region R6 is substantially located at 10 o'clock.

The transfer body 2 may be a single layer, or may be a laminate composed of a plurality of layers, which may include three layers of a surface layer, an elastic layer, and a compression layer. The surface layer is the outermost layer having an image forming surface where the ink image is formed. The compression layer absorbs deformation to disperse a local pressure change, keeping transferability even during printing at high speed. The elastic layer is a layer between the surface layer and the compression layer.

Various materials such as resin and ceramic can be used as the material of the surface layer as appropriate. In terms of properties such as durability, a material with a high compressive elastic modulus is employed. Specific examples include acrylic resin, acrylic silicone resin, fluorine-containing resin, and a condensate obtained by condensing a hydrolyzable organosilicon compound. The surface layer may be used after undergoing a surface treatment to improve wettability of the reaction liquid, transferability, and other properties. Examples of the surface treatment include a frame treatment, a corona treatment, a plasma treatment, a polishing treatment, a roughening treatment, an active energy ray irradiation treatment, an ozone treatment, a surfactant treatment, and a silane coupling treatment. Two or more of these treatments may be combined. The surface layer can also have any surface shape.

Examples of the material of the compression layer include acrylonitrile-butadiene rubber, acrylic rubber, chloroprene rubber, urethane rubber, and silicone rubber. Such a rubber material may be a porous rubber material made by blending a predetermined amount of a vulcanizing agent, vulcanizing accelerator, or other agents and further blending a foaming agent, or a filling agent such as hollow fine particles or salt as appropriate. The volume of each bubble in it varies with various pressure fluctuations, which results in less deformation in the directions other than the compression direction, providing more stable transferability and durability. The porous rubber material comes in two types; a material having an open cell structure in which pores communicate with one another and a material having a closed cell structure in which pores are separated from one another. Either structure or both of these structures may be used.

Various materials including resin and ceramic are usable as the material of the elastic layer as appropriate. In terms of processability and other properties, various elastomer materials or rubber materials are usable. Specific examples of such materials include fluorosilicone rubber, phenyl silicone rubber, fluorine-containing rubber, polychloroprene rubber, urethane rubber, and nitrile rubber. The examples further include ethylene propylene rubber, natural rubber, styrene rubber, isoprene rubber, butadiene rubber, ethylene-propylene-butadiene copolymer, and nitrile butadiene rubber. In particular, silicone rubber, fluorosilicone rubber, and phenyl silicone rubber have low permanent compression strain, which is beneficial to dimensional stability and durability. Each of these three materials exhibits a small change in elastic modulus due to temperature, which is beneficial to transferability.

Various adhesives or double-sided adhesive tape can also be used between the surface layer and the elastic layer and between the elastic layer and the compressed layer to fix these layers. The transfer body 2 may also include a reinforce layer with a high compressive elastic modulus to prevent lateral expansion when attached to the transfer drum 41 or retain resilience. Woven fabric may be used as a reinforce layer. The transfer body 2 can be produced by combining any layers made of above-described materials.

The circumferential surface of the pressurizing drum 42 is in pressed contact with the transfer body 2. At least one grip mechanism that grips on the leading edge of a print medium P is provided on the circumferential surface of the pressurizing drum 42. A plurality of grip mechanisms spaced apart from one another in the circumferential direction of the pressurizing drum 42 may be provided. An ink image on the transfer body 2 is transferred to the print medium P, when a print medium P passes through a nip portion between the pressurizing drum 42 and the transfer body 2 while being conveyed in tight contact with the circumferential surface of the pressurizing drum 42.

<Peripheral Units>

The peripheral units 5A to 5D are disposed around the transfer drum 41. In the present exemplary embodiment, the peripheral units 5A, 5B, 5C, and 5D are an absorption unit, a heating unit, a cleaning unit, and an application unit, respectively.

The absorption unit 5A is a mechanism that absorbs a liquid component from the ink image on the transfer body 2 before transfer. In the present exemplary embodiment, in particular, the absorption unit 5A is a mechanism for absorbing moisture from the ink image.

Reduced moisture in ink images leads to less blurred images printed on print media P. The absorption unit 5A includes an absorbing member in contact with an ink image that reduces moisture in the ink image. The absorbing member may be provided on the circumferential surface of a roller, or may be provided on an endless sheet and moved circularly. In terms of protection of ink images, the absorbing member may move in synchronization with the transfer body 2 at the same speed as that of the circumference speed of the transfer body 2. The absorbing member may include a porous body to be in contact with ink images. The average pore size of the porous body may be 10 μm or less in order to prevent adhesion of an ink solid content.

The heating unit 5B is a mechanism that heats the ink image on the transfer body 2 before transfer. Heating the ink image melts resin in the ink image forms a film of the ink image, enhancing transferability to a print medium P. The heating temperature can be equal to or higher than the minimum film forming temperature (MFT) of the resin. The MFT can be measured by each device that complies with a generally known method such as JIS K 6828-2: 2003 or ISO 2115: 1996. In terms of transferability and image robustness, ink images may be heated at a temperature higher than the MFT by 10° C. or higher, or by 20° C. or higher. The heating unit 5B can use a known heating device, e.g., any of various types of lamps such as infrared rays, or a warm air fan. An infrared heater can be used in terms of heating efficiency.

The cleaning unit 5C is a mechanism that cleans the transfer body 2 after transfer. The cleaning unit 5C removes ink remaining on the transfer body 2 and dust (e.g., paper powder) on the transfer body 2. The cleaning unit 5C can appropriately use a known method, such as a method of bringing a porous member into contact with the transfer body 2, a method of rubbing the surface of the transfer body 2 with a brush, or a method of scraping the surface of the transfer body 2 with a blade. A cleaning member for cleaning may be in a known shape such as a roller shape or a web shape.

The application unit 5D is a mechanism that applies a reaction liquid onto the transfer body 2 after cleaning and before discharge of the ink by the printing unit 3. The reaction liquid is a liquid that accelerates aggregation of a color material and that contains an ink viscosity increasing component. The ink viscosity increasing component may be, while not being particularly limited, a substance, such as metal ions or a polymeric coagulant, which causes a pH change of the ink to coagulate the color material in the ink, and be an organic acid.

Examples of the mechanism that applies the reaction liquid include a roller, a print head, a die coating apparatus (die coater), and a blade coating apparatus (blade coater). The reaction liquid applied to the transfer body 2 before the ink is discharged to the transfer body 2 prevents bleeding of mixed adjacent inks and beading of a landed ink drop being attracted to another ink drop landing later.

As described above, the printing system 1 according to the present exemplary embodiment includes the absorption unit 5A, the heating unit 5B, the cleaning unit 5C, and the application unit 5D as peripheral units. However, one or more of these units may additionally have the functionality of cooling the transfer body 2, or a cooling unit may be added to the printing system 1. In the present exemplary embodiment, the temperature of the transfer body 2 can be increased by heat of the heating unit 5B. A higher temperature of the ink image than the boiling point of water as a main ink solvent after the printing unit 3 discharges ink to the transfer body 2 may degrade the performance of moisture absorption by the absorption unit 5A. Cooling the transfer body 2 to keep the temperature of the discharged ink lower than the boiling point of water keeps the performance of moisture absorption.

The cooling unit may be an air blowing mechanism that blows air to the transfer body 2, or a mechanism that air- or water-cools the transfer body 2 in contact with a member (for example, a roller). The cooling unit may be a mechanism that cools the cleaning member of the cleaning unit 5C. The cooling timing may be in a period after the transfer and before the application of the reaction liquid.

<Supply Unit>

The supply unit 6 is a mechanism that supplies the ink to each of the print heads 30 of the printing unit 3. The supply unit 6 may be disposed where the rear unit 11 is located. The supply unit 6 includes reservoirs TK that each store a different type of ink from one another. Each of the reservoirs TK may be composed of an ink tank (a main tank) and a buffer tank. Each of the reservoirs TK and the corresponding one of the print heads 30 communicate with each other through a channel 6*a*, which is used to supply ink from the reservoir TK to the corresponding one of the print heads 30.

The channel 6*a* may circulate the ink between a reservoir TK and the corresponding one of print head 30, and may include a pump that circulates the ink. A deaeration mechanism that removes bubbles in the ink may be provided partway in the channel 6*a* or in each of the reservoirs TK. A valve that adjusts the fluid pressure of the ink and an atmospheric pressure may be disposed partway in the channel 6*a* or in each of the reservoirs TK.

The height of each of the reservoirs TK and the corresponding one of the print heads 30 in the Z direction may be designed so that the surface of the liquid ink in a reservoir TK is lower than the ink discharge surface of the corresponding one of the print heads 30.

<Conveyance Apparatus>

The conveyance apparatus 1B is an apparatus that feeds the print medium P to the transfer unit 4 and discharges, from the transfer unit 4, a printed product P' to which the ink image has been transferred. The conveyance apparatus 1B includes a feeding unit 7, a plurality of conveyance drums 8 and 8*a*, two sprockets 8*b*, a chain 8*c*, and a collection unit 8*d*. In FIG. 1, the arrow drawn inside each component of the conveyance apparatus 1B indicates the rotation direction of the component, and the arrow outside each component indicates the conveyance path for print media P or printed products P'. The print medium P is conveyed from the feeding unit 7 to the transfer unit 4, and the printed product P' is conveyed from the transfer unit 4 to the collection unit 8*d*. The area where the feeding unit 7 is located may be referred to as the upstream side in the conveyance direction, and the area where the collection unit 8*d* is located may be referred to as the downstream side.

The feeding unit 7 includes a stacking portion where a plurality of print media P are stacked, and a feeding mechanism that feeds the print media P one by one from the stacking portion to the conveyance drum 8 located at the most upstream position. Each of the conveyance drums 8 and 8*a* is a rotational body that rotates about the rotation axis in the Y direction, and has a cylindrically circumferential surface. At least one grip mechanism that grips on the leading edge of a print medium P (or a printed product P') is disposed on the circumferential surfaces of the conveyance drums 8 and 8*a*. The gripping operation and the release operation of each of the grip mechanisms are controlled so that each of the print media P is conveyed between the adjacent conveyance drums.

The two conveyance drums 8*a* are used to reverse print media P. In single-sided printing, the conveyance drums 8*a* are not used to convey print media P. In double-sided printing, after the transfer to the front surface of a print medium P, the print medium P is conveyed from the pressurizing drum 42 to the conveyance drums 8*a*, instead of being conveyed to the conveyance drum 8 adjacent in the downstream side. The print medium P is reversed via the two conveyance drums 8*a*, and conveyed to the pressurizing drum 42 again, via the conveyance drum 8 disposed upstream from the pressurizing drum 42. As a result, the back surface of the print medium P faces the transfer drum 41, and another ink image is transferred to the back surface.

The chain 8*c* is wound around the two sprockets 8*b*. One of the two sprockets 8*b* is a driving sprocket, and the other is a driven sprocket. The chain 8*c* is circulated by the rotation of the driving sprocket. The chain 8*c* includes a plurality of grip mechanisms spaced apart from one another in the longitudinal direction thereof. Each of the grip mechanisms grips on the edge of a printed product P'. The printed product P' is conveyed from the conveyance drum 8 located at the downstream end to each of the grip mechanisms of the chain 8*c*, and the printed product P' held by the grip mechanism is conveyed to the collection unit 8*d* by movement of the chain 8*c*, and then gripping is released. As a result, the printed product P' is placed in the collection unit 8*d*.

<Post-Process Unit>

The conveyance apparatus 1B includes post-process units 10A and 10B. The post-process units 10A and 10B are mechanisms disposed downstream from the transfer unit 4, and each carries out a post-process on the printed product P'. The post-process unit 10A carries out a process on the front surface of a printed product P', and the post-process unit 10B carries out a process on the back surface of the printed product P'. The post-process includes performing coating on the image printed surface of the printed product P', for protection, glossy, and other purposes. Examples of the coating include liquid application, sheet welding, and lamination.

<Inspection Unit>

The conveyance apparatus 1B includes inspection units 9A and 9B. The inspection units 9A and 9B are disposed downstream from the transfer unit 4, and inspect printed products P'.

In the present exemplary embodiment, the inspection unit 9A is an image capturing apparatus that captures an image printed on a printed product P' and includes an image sensor such as a charge-coupled device (CCD) sensor or a complementary metal-oxide semiconductor (CMOS) sensor. The inspection unit 9A captures printed images while printing operation is continuously performed. Based on the images captured by the inspection unit 9A, a temporal change in tint or other image properties of the printed images can be found, and whether to correct print data can be determined. In the present exemplary embodiment, the inspection unit 9A has an image capturing range set in the circumferential surface of the pressurizing drum 42 and is disposed to capture a partial printed image immediately after the transfer.

The inspection unit 9A may inspect all the printed images, or may inspect the printed image every predetermined number of sheets.

In the present exemplary embodiment, the inspection unit 9B is also an image capturing apparatus that captures images printed on printed products P' and includes an image sensor such as a CCD sensor or a CMOS sensor. The inspection unit 9B captures printed images in test printing operation. The inspection unit 9B can capture a printed image entirely. Based on the images captured by the inspection unit 9B, basic settings for various types of correction on print data can be made. In the present exemplary embodiment, the inspection unit 9B is disposed at a position for capturing printed products P' conveyed by the chain 8*c*. The inspection unit 9B captures a printed image entirely after stopping the movement of the chain 8*c* temporarily. The inspection unit 9B may be a scanner that scans a printed product P'.

<Control Unit>

Figure 4:
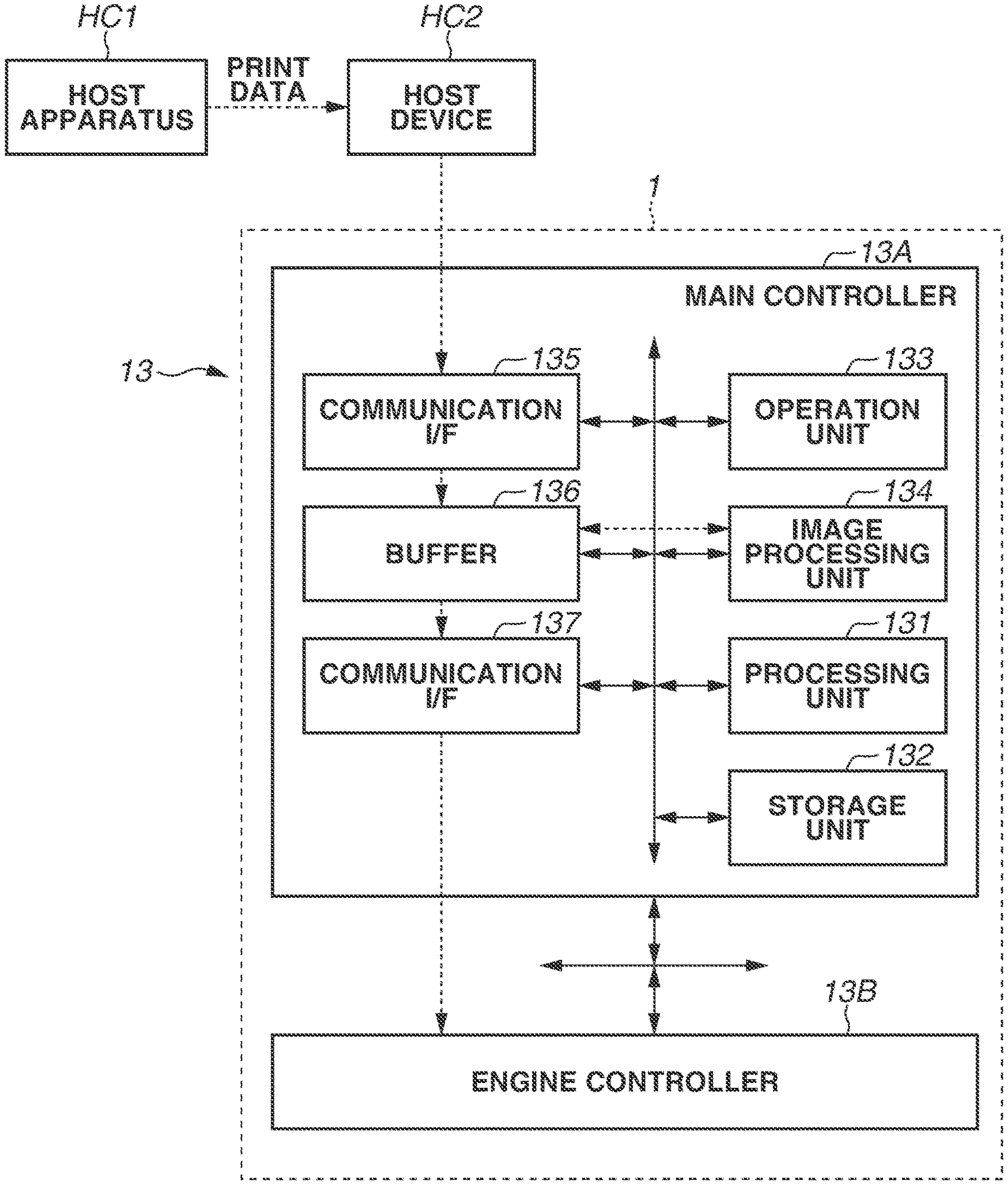
FIG. 4 is a block diagram of a control system of the printing system according to the first exemplary embodiment.
Figure 5:
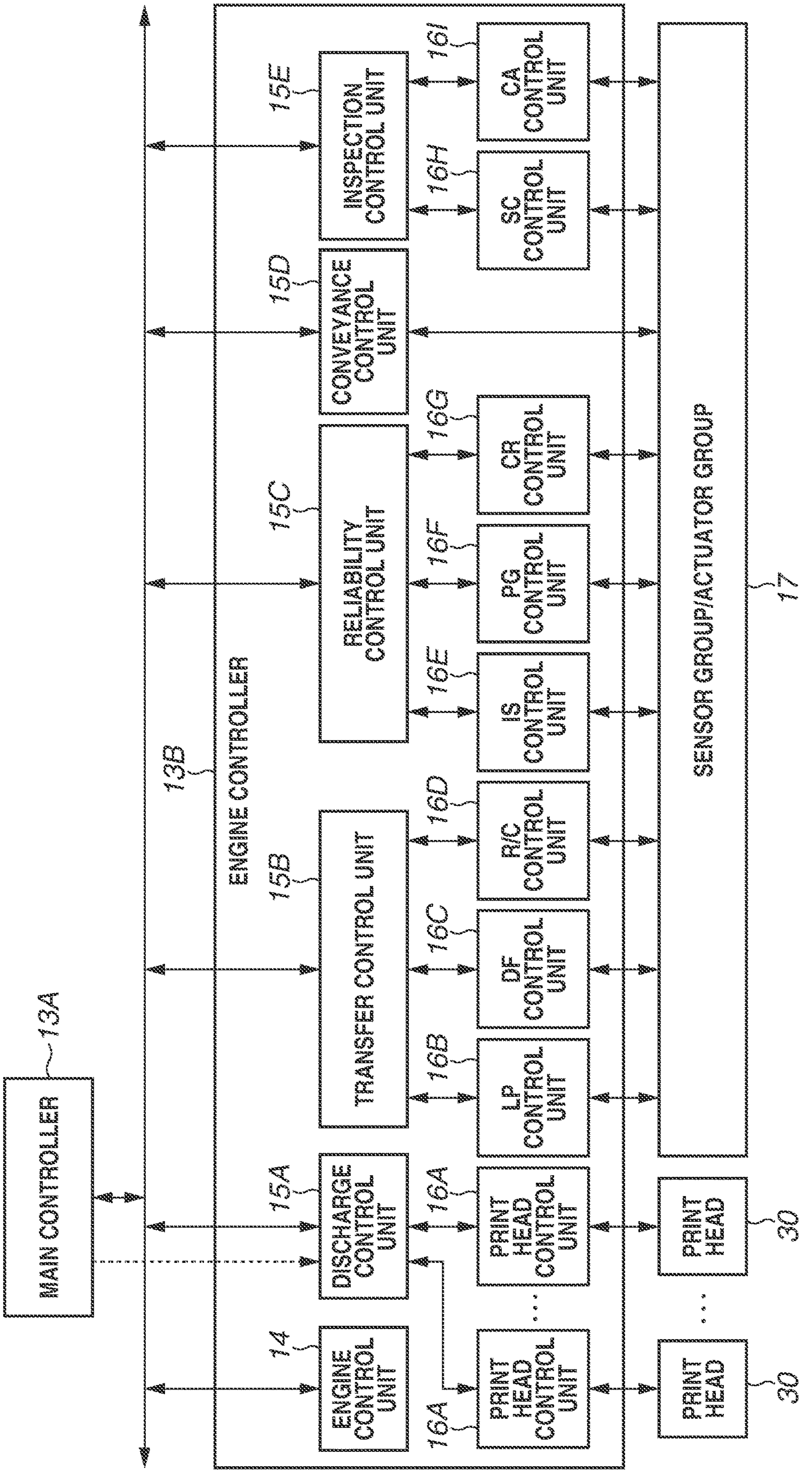
FIG. 5 is a block diagram of the control system of the printing system according to the first exemplary embodiment.

Next, a control unit of the printing system 1 will be described. FIG. 4 and FIG. 5 are block diagrams of a control unit 13 of the printing system 1. The control unit 13 is communicatively connected to a host device (DFE) HC2, and the host device HC2 is communicatively connected to a host apparatus HC1.

In the host apparatus HC1, the print data as a source of a printed image is generated. The print data here is generated in the format of an electronic file such as a document file or an image file. This print data is transmitted to the host device HC2, and the host device HC2 converts the received print data into a data format (e.g., CMYK-color data) that can be used in the control unit 13. The converted print data is transmitted from the host device HC2 to the control unit 13, and the control unit 13 starts printing operation based on the received print data.

In the present exemplary embodiment, the control unit 13 is roughly composed of a main controller 13A and an engine controller 13B. The main controller 13A includes a processing unit 131, a storage unit 132, an operation unit 133, an image processing unit 134, a communication (interface) I/F 135, a buffer 136, and a communication I/F 137.

The processing unit 131 is a processor such as a central processing unit (CPU), and runs programs stored in the storage unit 132, thereby controlling the entire main controller 13A. The storage unit 132 is a storage device such as a random access memory (RAM), a read only memory (ROM), a hard disk, and a solid state drive (SSD), and stores programs to be run by the processing unit (CPU) 131 and data, and also serves as a work area for the processing unit (CPU) 131. The operation unit 133 is an input device including a touch panel, a keyboard, and a mouse, and receives instructions from users.

The image processing unit 134 is, for example, an electronic circuit including an image processing processor. The buffer 136 is, for example, a RAM, a hard disk, or an SSD. The communication I/F 135 communicates with the host device HC2, and the communication I/F 137 communicates with the engine controller 13B.

In FIG. 4, broken-line arrows each indicate a procedure of processing of print data. The print data received from the host device HC2 via the communication I/F 135 is accumulated in the buffer 136. The image processing unit 134 reads out the print data from the buffer 136, performs predetermined image processing on the readout print data, and stores the processed data in the buffer 136 again. The print data stored in the buffer 136 after the image processing is transmitted from the communication I/F 137 to the engine controller 13B.

As illustrated in FIG. 5, the engine controller 13B includes control units 15A to 15E and 16A to 16I, acquires detection results of a sensor group/actuator group 17 included in the printing system 1, and controls driving of these groups. These control units each include a processor such as a CPU and a storage device such as a RAM or a ROM, and an interface with an external device. The division of the control units is an example, and a plurality of subdivided control units may perform partial control, or conversely, the control units may be integrated into one control unit to perform the whole control thereof.

An engine control unit 14 controls the entire engine controller 13B. A discharge control unit 15A controls a print head control unit 16A provided for each of the print heads 30. Further, the discharge control unit 15A converts print data received from the main controller 13A into a data format suitable for driving of the print heads 30, such as raster data. Each of the print head control units 16A controls discharge from the corresponding one of the print heads 30.

A transfer control unit 15B controls an LP control unit 16B, a DF control unit 16C, and an R/C control unit 16D. The LP control unit 16B controls the absorption unit 5A. The DF control unit 16C controls the heating unit 5B. The R/C control unit 16D controls the cleaning unit 5C and the application unit 5D.

A reliability control unit 15C controls an IS control unit 16E, a PG control unit 16F, and a CR control unit 16G. The IS control unit 16E controls the supply unit 6. The PG control unit 16F controls the recovery unit 12. The CR control unit 16G controls the drive mechanism that moves the printing unit 3 between the discharge position POS1 and the recovery position POS2.

A conveyance control unit 15D controls the conveyance apparatus 1B. An inspection control unit 15E controls a SC control unit 16H and a CA control unit 16I. The SC control unit 16H controls the inspection unit 9B. The CA control unit 16I controls the inspection unit 9A.

Of the sensor group/actuator group 17, the sensor group includes sensors for detecting the positions or speeds of moving portions, sensors for detecting temperatures, and an image sensor. The actuator group includes motors, electromagnetic solenoids, and electromagnetic valves.

<Operation Example>

Figure 6:
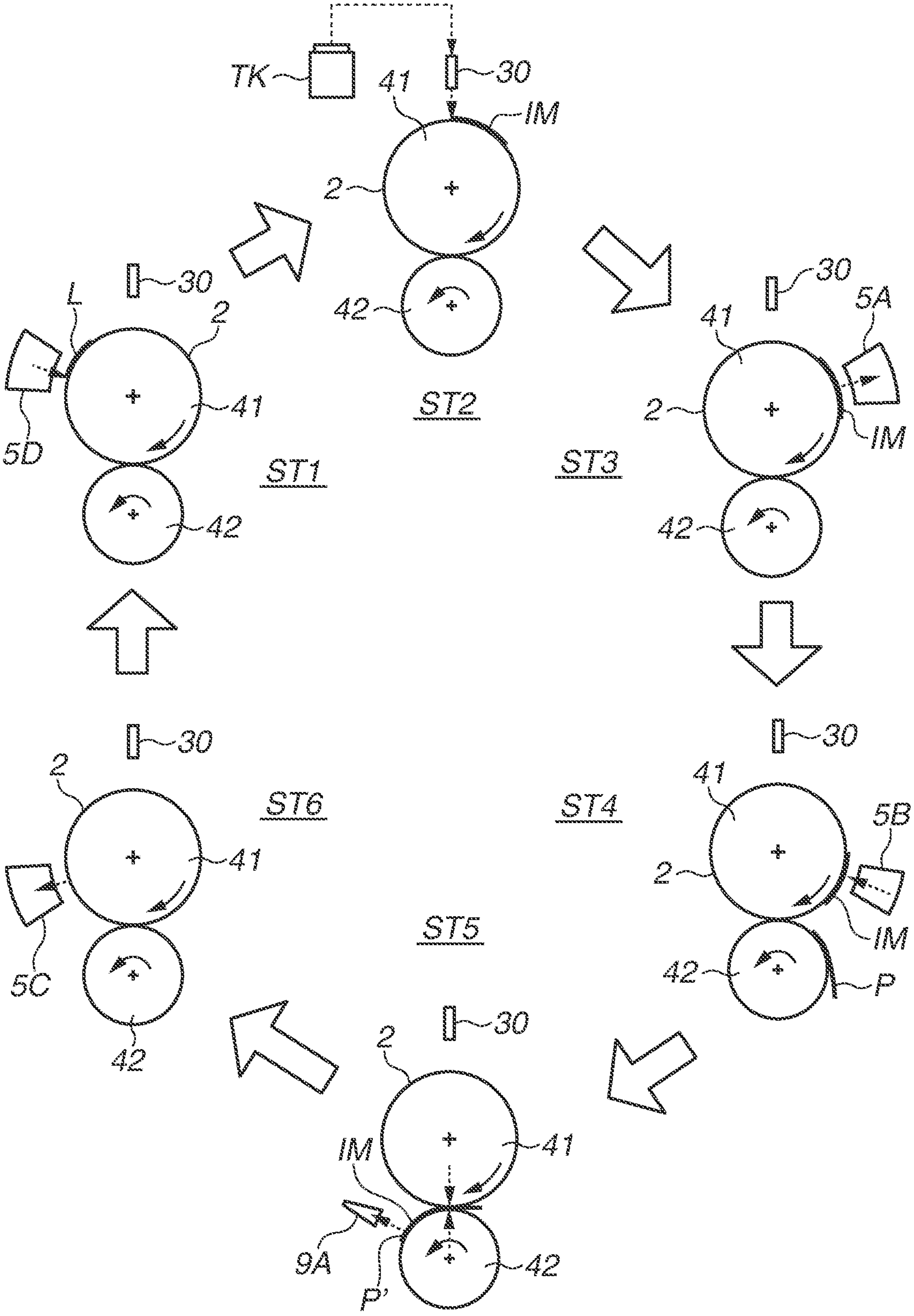
FIG. 6 is a diagram illustrating an example of operation of the printing system according to the first exemplary embodiment.

FIG. 6 is a diagram schematically illustrating an example of printing operation. The following processes are performed in cycles while the transfer drum 41 and the pressurizing drum 42 rotate. First, as illustrated in a state ST1, a reaction liquid L is applied onto the transfer body 2 from the application unit 5D. The portion of the transfer body 2 with the reaction liquid L applied thereto moves as the transfer drum 41 rotates. When the portion arrives under the print head 30, the print head 30 discharges ink to the transfer body 2 as illustrated in a state ST2, forming an ink image IM. In this process, the discharged ink mixes with the reaction liquid L on the transfer body 2, accelerating the aggregation of the color material. The ink to be discharged is supplied from the corresponding reservoir TK of the supply unit 6 to the print head 30.

The ink image IM on the transfer body 2 moves as the transfer body 2 rotates. When the ink image IM arrives at the absorption unit 5A, the absorption unit 5A absorbs moisture in the ink image IM, as illustrated in a state ST3. When the ink image IM arrives at the heating unit 5B, the heating unit 5B heats the ink image IM as illustrated in a state ST4, melting resin in the ink image IM into a film of the ink image IM. In synchronization with such formation of the ink image IM, a print medium P is conveyed by the conveyance apparatus 1B.

As illustrated in a state ST5, when the ink image IM and the print medium P reach the nip portion between the transfer body 2 and the pressurizing drum 42, the ink image IM is transferred to the print medium P, producing a printed product P'. Upon passing through the nip portion, the image printed on the product P' is captured and inspected by the inspection unit 9A. The conveyance apparatus 1B then conveys the printed product P' to the collection unit 8*d*.

Upon reaching the cleaning unit 5C, the portion where the ink image IM has been formed on the transfer body 2 is cleaned by the cleaning unit 5C as illustrated in a state ST6. When the cleaning ends, one rotation of the transfer body 2 is completed, and subsequently, the transfer of an ink image to a print medium P is repeated in a similar procedure. For easy understanding of the description, the transfer of an ink image IM to one print medium P during one rotation of the transfer body 2 has been described, but the transfer of an ink image IM to two or more print media P during one rotation of the transfer body 2 can be continuously performed.

Figure 7:
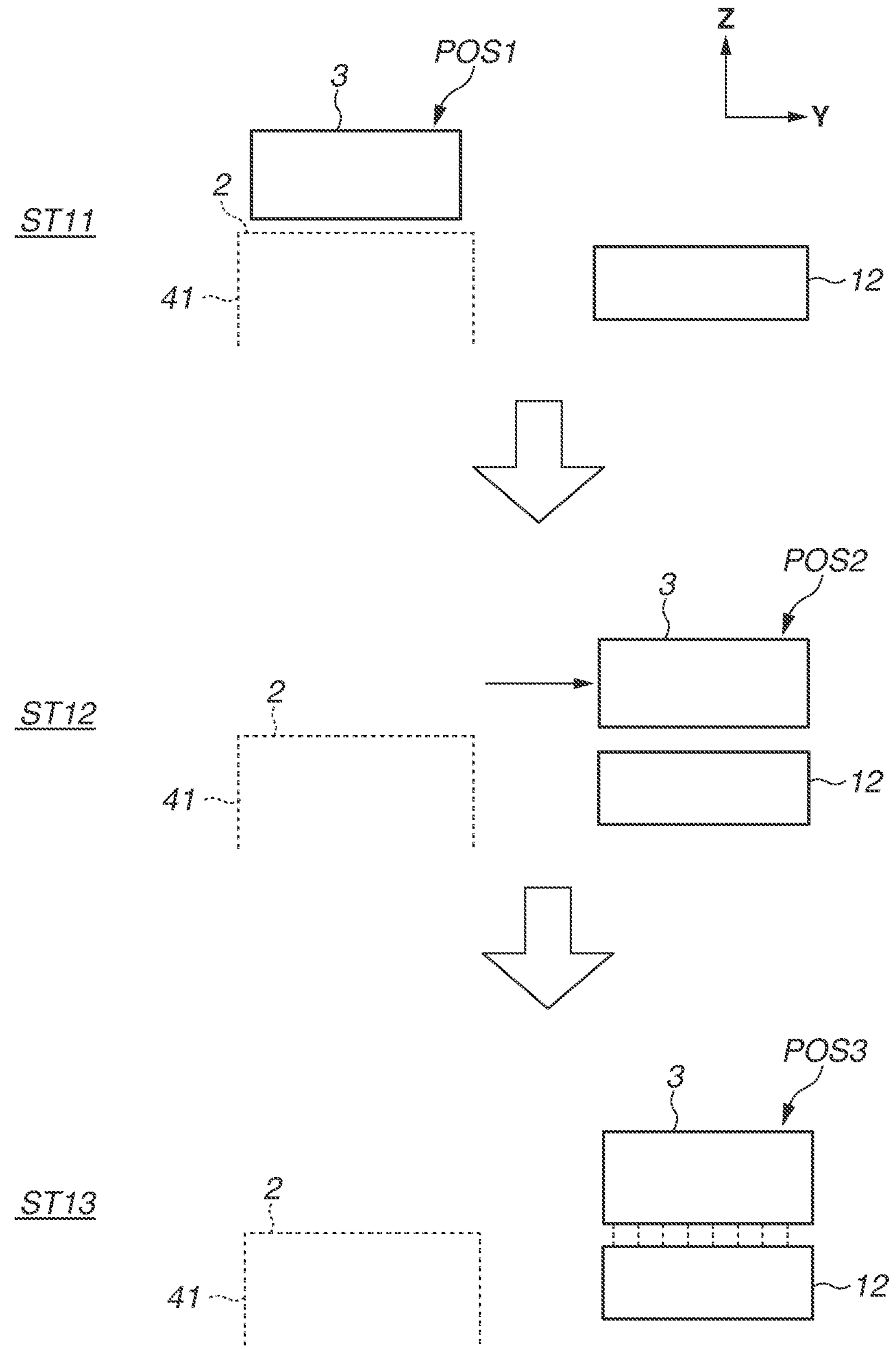
FIG. 7 is a diagram illustrating an example of operation of the printing system according to the first exemplary embodiment.

Such continuous printing operations entails the maintenance of each of the print heads 30. FIG. 7 illustrates an example of operation in the maintenance of each of the print heads 30. In a state ST11, the printing unit 3 is at the discharge position POS1. In a state ST12, the printing unit 3 is moved to the recovery position POS2. Afterward, as illustrated in a state ST13, the recovery unit 12 performs a process of recovering the performance of each of the print heads 30 of the printing unit 3.

Figure 8A:
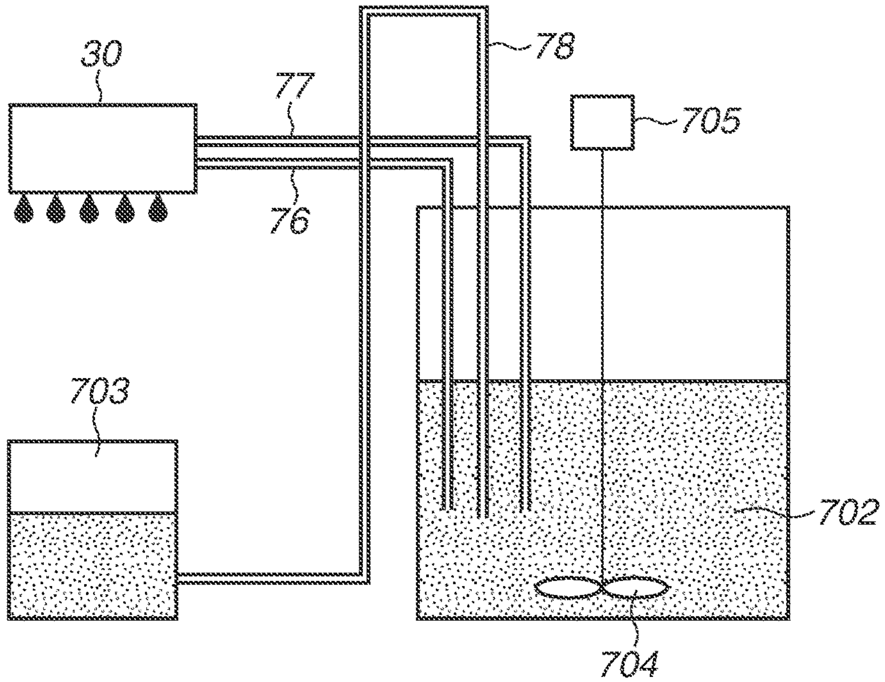
FIGS. 8A and B are schematic diagrams of an ink supply unit according to the first exemplary embodiment.
Figure 8B:
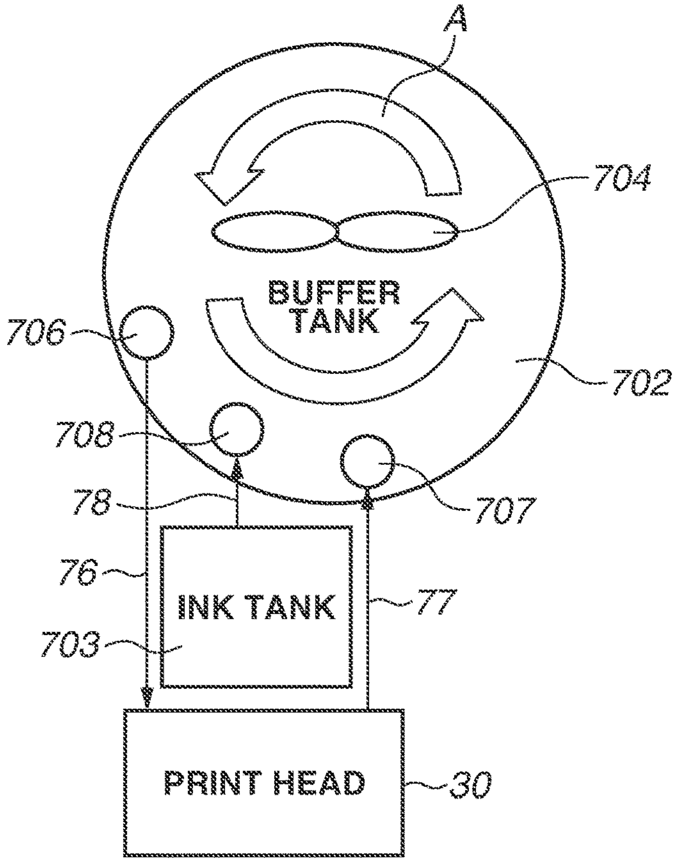

FIGS. 8A and 8B are schematic diagrams of the details of the supply unit 6, and, specifically, FIG. 8A schematically illustrates a configuration of the supply unit 6. The supply unit 6 includes a buffer tank 702 for storing ink to be supplied to the corresponding one of the print heads 30, and an ink tank 703 (the main tank) for storing ink to be supplied to the buffer tank 702. One ink buffer tank 702 and one ink tank 702 are for one color of ink. The buffer tank 702 and the ink tank 703 constitute one reservoir TK.

The buffer tank 702 and the ink tank 703 are connected by a replenishment channel 78. The ink is supplied for replenishment from the ink tank 703 to the buffer tank 702 through the replenishment channel 78 with, for example, a decrease in the amount of or an increase in the concentration of the ink stored in the buffer tank 702. The replenishment of the ink from the ink tank 703 to the buffer tank 702 may be performed based on an instruction from the IS control unit 16E, or when the ink tank 703 is replaced by a user. Further, a unit for stirring the ink and a unit for detecting the amount of the stored ink may be disposed inside the ink tank 703.

The buffer tank 702 and the corresponding one of the print heads 30 are connected by a supply channel 76 and a collecting channel 77, both of which constitute one circulation channel. The ink stored in the buffer tank 702 is supplied to the corresponding one of the print heads 30 through the supply channel 76. The ink that has not been discharged is collected from the corresponding one of the print heads 30 to the buffer tank 702 through the collecting channel 77. The replenishment channel 78, the supply channel 76, and the collecting channel 77 constitute the channel 6*a* of the supply unit 6.

FIG. 8B illustrates a top view of the buffer tank 702. The buffer tank 702 has a supply port 706 out of which the ink flows to the supply channel 76, a collection port 707 into which the ink collected through the collecting channel 77 flows, and a replenishment port 708 into which the ink supplied for replenishment through the replenishment channel 78 flows. Each of these channels extends in the buffer tank 702, as illustrated in FIG. 8A. Thus, the opening of the supply channel 76 in the buffer tank 702 is the supply port 706, the opening of the collecting channel 77 in the buffer tank 702 is the collection port 707, and the opening of the replenishment channel 78 in the buffer tank 702 is the replenishment port 708.

Further, a stirring unit 704 for stirring the ink is disposed inside the buffer tank 702, and the stirring unit 704 is rotated by a stirring motor 705 disposed outside the buffer tank 702. The stirring unit 704 includes a fan, and is rotated in a predetermined direction (first rotation direction) by the stirring motor 705, thereby stirring the ink supplied for replenishment from the ink tank 703 and the ink collected from the corresponding one of the print heads 30. This reduces concentration unevenness of the ink to be supplied to the corresponding one of the print heads 30, thereby making the concentration uniform.

Here, for the stirring unit 704 to start its rotation at the supply port 706 in a rotation direction A in FIG. 8B, the replenishment port 708 and the collection port 707 are arranged downstream in this order in the rotation direction A. Further, where the distance from the supply port 706 to the replenishment port 708 is L and the distance from the replenishment port 708 to the supply port 706 is L' in the rotation direction A, each of the channels and the buffer tank 702 are connected to satisfy the condition of L<L'. The ink collected from the corresponding one of the print heads 30 through the collection port 707 with a relatively high concentration is thereby sufficiently stirred before being supplied to the corresponding one of the print heads 30 through the supply port 706. This allows the ink adjusted to an appropriate concentration to be supplied to the corresponding one of the print head 30, keeping printing quality of the corresponding one of the print head 30 appropriate.

The positions and the order of the collection port 707 and the replenishment port 708 may be different from those in the example illustrated in FIG. 8B, if the positions satisfy the condition of L<L'. In other words, the supply port 706, the collection port 707, and the replenishment port 708 may be arranged in this order in the rotation direction A of the stirring unit 704.

As described above, the supply port 706, the collection port 707, and the replenishment port 708 are arranged in proximity to each other in the rotation direction A in the buffer tank 702, reducing the concentration unevenness of the ink, supplying the ink with a uniform concentration to the corresponding one of the print heads 30. Further, the arrangement of the supply port 706, the collection port 707, and the replenishment port 708 allows stirring efficiency to be maintained even in the buffer tank 702 having a small cross-section area or a small inner volume, contributing to a reduction in the size of the apparatus.

Figure 9A:
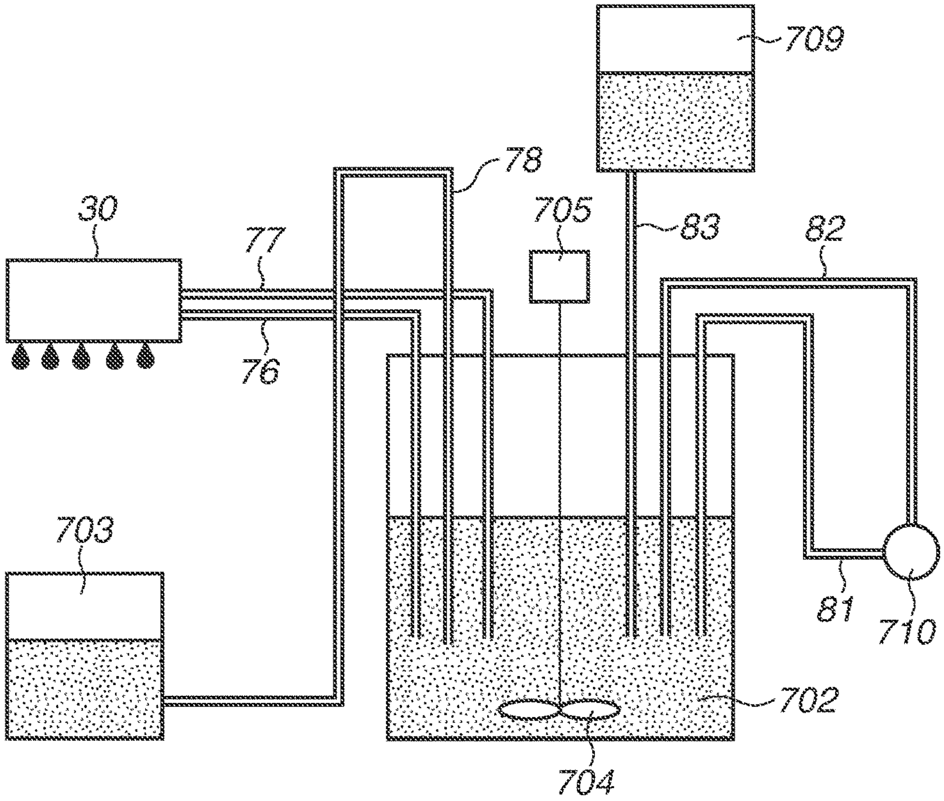
FIGS. 9A and B are schematic diagrams of an ink supply unit according to a second exemplary embodiment.
Figure 9B:
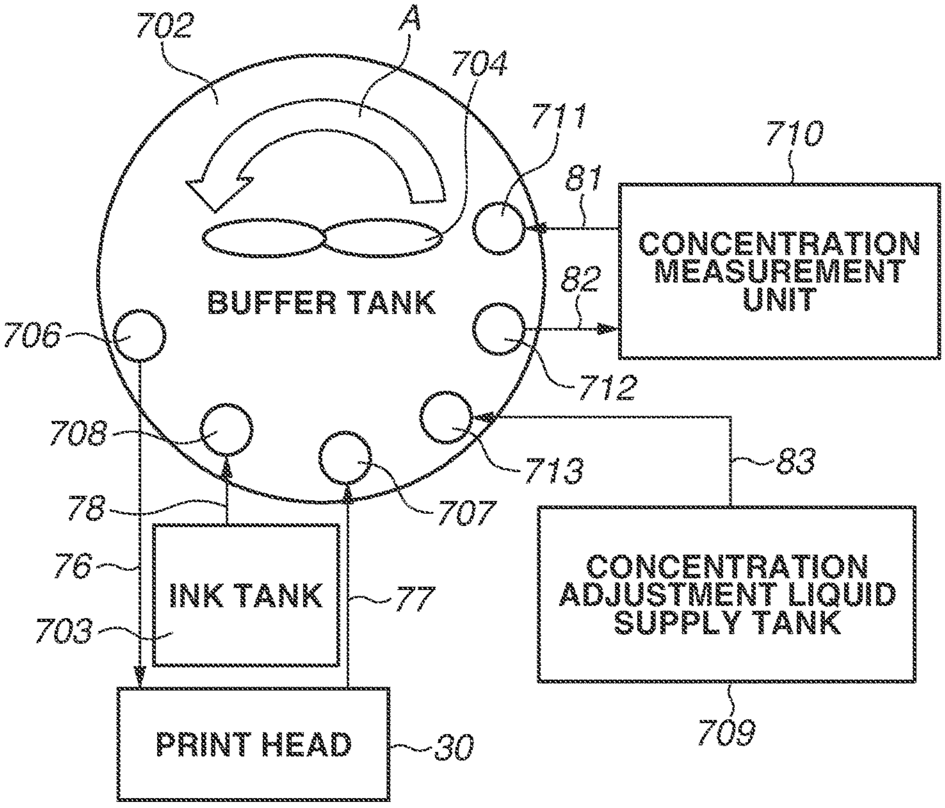

A configuration of a supply unit 6 according to a second exemplary embodiment will be described with reference to FIGS. 9A and 9B. The description of the configuration similar to that of the first exemplary embodiment will be omitted. FIG. 9A illustrates a schematic diagram of the supply unit 6 of the second exemplary embodiment, and FIG. 9B illustrates a top view of a buffer tank 702 of the second exemplary embodiment.

The supply unit 6 of the second exemplary embodiment further includes a concentration adjustment liquid supply tank (an adjustment liquid tank) 709, which stores a concentration adjustment liquid for adjusting the concentration of ink in the buffer tank 702, and a concentration measurement unit 710 for measuring the concentration of the ink in the buffer tank 702. The buffer tank 702 and the concentration adjustment liquid supply tank 709 are connected by a second replenishment channel 83. The buffer tank 702 and the concentration measurement unit 710 are connected by a second collecting channel 81 and a second supply channel 82.

The concentration adjustment liquid supply tank 709 is a supply unit that stores the concentration adjustment liquid for adjusting the concentration of the ink in the buffer tank 702 for increased concentrations of the ink in the buffer tank 702. The concentration of the ink increases mainly because of the evaporation of moisture included in the ink. For example, purified water is used as water for diluting increased concentrations of the ink to adjust the concentration.

The concentration of the ink in the buffer tank 702 fluctuates due to, for example, an external environment or image forming operation, and thus is maintained at an appropriate concentration with the concentration adjustment liquid supplied to the buffer tank 702 through the second replenishment channel 83.

The supply of the concentration adjustment liquid from the concentration adjustment liquid supply tank 709 to the buffer tank 702 may be performed based on an instruction from an IS control unit 16E. Further, a unit for detecting the amount of the stored concentration adjustment liquid may be provided inside the concentration adjustment liquid supply tank 709.

The concentration measurement unit 710 includes a concentration measuring instrument for measuring the concentration of the ink in the buffer tank 702. Examples of the concentration measurement unit 710 that can be employed include a unit with a light emitting device and a light receiving device included therein. The light emitting device emits light that passes through a channel in which ink runs, and the light receiving device receives the light that has passed through the channel. The unit detects the concentration of the ink based on the quantity of the emitted light and the quantity of the received light. The concentration measurement unit 710 measures the concentration of the ink supplied from the buffer tank 702 through the second supply channel 82, and the ink which has undergone the measurement is collected into the buffer tank 702 through the second collecting channel 81. In other words, the ink is circulated between the buffer tank 702 and the concentration measurement unit 710.

If the concentration of the ink measured by the concentration measurement unit 710 exceeds a threshold, a predetermined amount of the concentration adjustment liquid is supplied from the concentration adjustment liquid supply tank 709, so that the concentration of the ink in the buffer tank 702 is appropriately maintained. The amount of the concentration adjustment liquid to be supplied may be a predetermined fixed amount or may be a variable amount calculated based on the concentration of the ink measured by the concentration measurement unit 710.

Thus, a stirring unit 704 in the buffer tank 702 stirs the concentration adjustment liquid supplied from the concentration adjustment liquid supply tank 709, in addition to ink supplied for replenishment from an ink tank 703, and ink collected from the corresponding one of the print heads 30. The ink concentration is adjusted to a more appropriate concentration than that in the first exemplary embodiment.

FIG. 9B illustrates a top view of the buffer tank 702 in the second exemplary embodiment. The buffer tank 702 has a supply port 706 out of which the ink flows to a supply channel 76, a collection port 707 into which the ink collected through a collecting channel 77 flows, and a replenishment port 708 into which the ink supplied for replenishment through a replenishment channel 78 flows. The buffer tank 702 further has a second replenishment port 713 into which the concentration adjustment liquid supplied for replenishment through the second replenishment channel 83 flows, a second supply port 712 out of which the ink flows to the second supply channel 82, and a second collection port 711 into which the ink collected through the second collecting channel 81 flows.

As with the first exemplary embodiment, each of the channels extends in the buffer tank 702 as illustrated in FIG. 9B. The opening of the supply channel 76 in the buffer tank 702 is the supply port 706, and the opening of the collecting channel 77 in the buffer tank 702 is the collection port 707, and the opening of the replenishment channel 78 in the buffer tank 702 is the replenishment port 708. Similarly, the opening of the second replenishment channel 83 in the buffer tank 702 is the second replenishment port 713, the opening of the second supply channel 82 in the buffer tank 702 is the second supply port 712, and the opening of the second collecting channel 81 in the buffer tank 702 is the second collection port 711.

Figure 10:
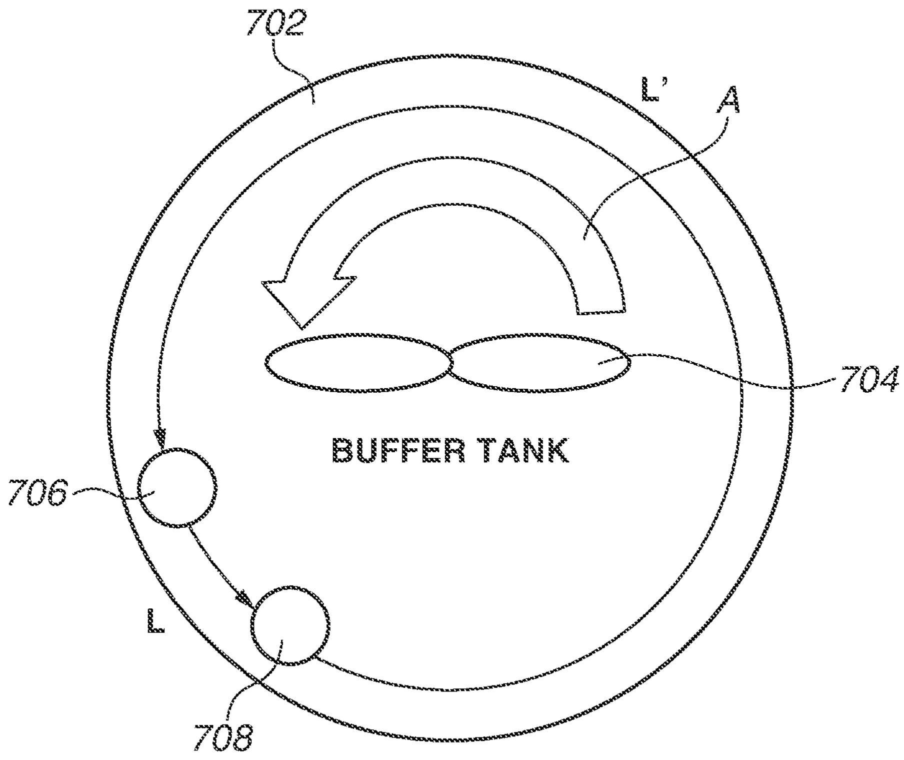
FIG. 10 is a simple top view of a buffer tank according to the second exemplary embodiment.

For the stirring unit 704 to start its rotation at the supply port 706 in FIG. 9B in a direction A, the replenishment port 708, the collection port 707, the second replenishment port 713, the second supply port 712, and the second collection port 711 are arranged downstream in this order in the rotation direction A. FIG. 10 is a simple schematic top view of the buffer tank 702 of the second exemplary embodiment. As illustrated in FIG. 10, where the distance from the supply port 706 to the replenishment port 708 is L and the distance from the replenishment port 708 to the supply port 706 is L' in the rotation direction A, each of the channels and the buffer tank 702 are connected to satisfy the condition of $L<L'$. In other words, each of the channels is connected to satisfy the same condition as that of the first exemplary embodiment, even if the number of channels connected to the buffer tank 702 increases.

In the present exemplary embodiment, as illustrated in FIG. 9B, the configuration in which each of the channels is connected in a range from the replenishment port 708 to the supply port 706 in the rotation direction A satisfies the condition of $L<L'$. However, the arrangement of the channels is not limited thereto, and the positions and the order of the replenishment port 708, the collection port 707, the second replenishment port 713, the second supply port 712, and the second collection port 711 may be different.

The above-described configuration has the effects similar to those of the first exemplary embodiment. Further, the configuration allows the measurement of the concentration of the ink in the buffer tank 702 and then adjustment of the concentration, making the concentration of the ink uniform with higher accuracy.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-142110, filed Aug. 25, 2020, which is hereby incorporated by reference herein in its entirety.

What is claimed is:

1. A printing apparatus comprising:

a tank configured to store a liquid to be supplied to a print head;

a first supply channel, which opens in the tank through a first supply port, configured to supply the liquid from the tank to the print head;

a first replenishment channel, which opens in the tank through a first replenishment port, configured to replenish the tank with the liquid;

a stirring unit in the tank, the stirring unit being configured to stir the liquid in the tank by rotating in a first rotation direction;

a control unit configured to control operation of replenishing the tank with the liquid through the first replenishment channel without an instruction by a user; and a detecting unit configured to detect an amount of the liquid to be disposed in the tank, wherein, in the tank, a first distance from the first supply port to the first replenishment port in the first rotation direction is less than a second distance from the first replenishment port to the first supply port in the first rotation direction.

2. The printing apparatus according to claim 1, further comprising a first collecting channel, which opens in the tank through a first collection port, configured to collect the liquid from the print head into the tank.

3. The printing apparatus according to claim 2, wherein, in the tank, the first replenishment port and the first collection port are arranged in this order with the supply port as a starting point in the first rotation direction.

4. The printing apparatus according to claim 1, further comprising a second replenishment channel, which opens in the tank through a second replenishment port, configured to replenish an adjustment liquid for adjusting a concentration of the liquid stored in the tank.

5. The printing apparatus according to claim 4, wherein the adjustment liquid is purified water.

6. The printing apparatus according to claim 4, wherein, in the tank, the first replenishment port and the second replenishment port are arranged in this order with the supply port as a starting point in the first rotation direction.

7. The printing apparatus according to claim 2, further comprising:

a concentration measurement unit configured to measure a concentration of the liquid stored in the tank;

a second supply channel configured to supply the liquid from the tank to the concentration measurement unit; and a second collecting channel configured to collect the liquid from the concentration measurement unit into the tank.

8. The printing apparatus according to claim 7, wherein the adjustment liquid is replenished from the second replenishment channel based on the measured concentration.

9. The printing apparatus according to claim 7, wherein, in the tank, a second supply port at which the second supply channel opens in the tank and a second collection port at which the second collecting channel opens in the tank are disposed from the first replenishment port to the first supply port in the first rotation direction.

10. The printing apparatus according to claim 1, further comprising a second tank configured to store the liquid to be supplied to replenish the tank via the second replenishment channel.

11. A printing apparatus comprising:

a tank configured to store a liquid to be supplied to a print head;

a first supply channel, which opens in the tank through a first supply port, configured to supply the liquid from the tank to the print head;

a first replenishment channel, which opens in the tank through a first replenishment port, configured to replenish the tank with the liquid;

a stirring unit in the tank, the stirring unit being configured to stir the liquid in the tank by rotating in a first rotation direction, and a second replenishment channel, which opens in the tank through a second replenishment port, configured to replenish an adjustment liquid for adjusting a concentration of the liquid stored in the tank wherein, in the tank, a first distance from the supply port to the first replenishment port in the first rotation direction is less than a second distance from the first replenishment port to the first supply port in the first rotation direction.

12. The printing apparatus according to claim 11, wherein the adjustment liquid is purified water.

13. The printing apparatus according to claim 11, wherein, in the tank, the first replenishment port and the second replenishment port are arranged in this order with the first supply port as a starting point in the first rotation direction.

14. The printing apparatus according to claim 11, further comprising:

a concentration measurement unit configured to measure a concentration of the liquid stored in the tank;

a second supply channel configured to supply the liquid from the tank to the concentration measurement unit; and a collecting channel configured to collect the liquid from the concentration measurement unit into the tank.

* * * * *